United States Patent
Maduta et al.

(10) Patent No.: US 10,792,677 B2
(45) Date of Patent: Oct. 6, 2020

(54) CYCLONE WITH GUIDE VANES

(71) Applicant: OUTOTEC (FINLAND) OY, Espoo (FI)

(72) Inventors: Robert Maduta, Hemsbach (DE); Krystian Jastrzebski, Frankfurt am Main (DE); Linus Perander, Stokke (NO)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/724,885

(22) Filed: Dec. 23, 2019

(65) Prior Publication Data
US 2020/0122162 A1  Apr. 23, 2020

Related U.S. Application Data

(63) Continuation of application No. PCT/EP2018/067806, filed on Jul. 2, 2018.

(30) Foreign Application Priority Data

Jul. 3, 2017 (DE) .................. 10 2017 114 757

(51) Int. Cl.

| | |
|---|---|
| *B01D 45/12* | (2006.01) |
| *B04C 5/103* | (2006.01) |
| *B04C 5/13* | (2006.01) |
| *B04C 5/04* | (2006.01) |
| *B04C 9/00* | (2006.01) |

(52) U.S. Cl.
CPC ................. *B04C 5/04* (2013.01); *B04C 5/13* (2013.01); *B01D 45/12* (2013.01); *B04C 5/103* (2013.01);
(Continued)

(58) Field of Classification Search
None
See application file for complete search history.

(56) References Cited

U.S. PATENT DOCUMENTS

| | | | |
|---|---|---|---|
| 3,504,804 A | | 4/1970 | Newman et al. |
| 3,961,923 A | * | 6/1976 | Zia Rouhani .......... B01D 45/12 55/457 |

(Continued)

FOREIGN PATENT DOCUMENTS

| | | |
|---|---|---|
| DE | 4329662 A1 | 3/1995 |
| WO | 9309883 A1 | 5/1993 |

OTHER PUBLICATIONS

International Search Report issued by the European Patent Office acting as the International Searching Authority in relation to International Application No. PCT/EP2018/067806 dated Oct. 4, 2018 (4 pages).

(Continued)

*Primary Examiner* — Bradley R Spies
(74) *Attorney, Agent, or Firm* — Robert P. Michal, Esq.; Carter, DeLuca & Farrell LLP

(57) ABSTRACT

A cyclone for the separation of solid particles and/or at least one liquid from a fluid, featuring a housing, an inlet opening for introducing the fluid together with the solid particles and/or the at least one liquid into the housing, a discharge port for the solid particles and/or the at least one liquid, a dip tube for discharging the fluid from the housing, and at least two guide vanes. Each guiding vanes shows a geometrical form with at least three edges e1, e2, e3. Further, each guide vane is directly or indirectly fixed to the housing with at least one edge e3 at a fixing point, whereby an area a is defined as the cross-sectional area of the housing intersecting the fixed edges e3. In addition, each guide vane shows at least two edges e1 and e2 which are not fixed to the housing, whereby the first edge e1 has a distance d1 and the second edge e2 has a distance d2, and whereby d1<d2 to the centerline c of the housing. According to the invention, the (Continued)

Figure 1A:
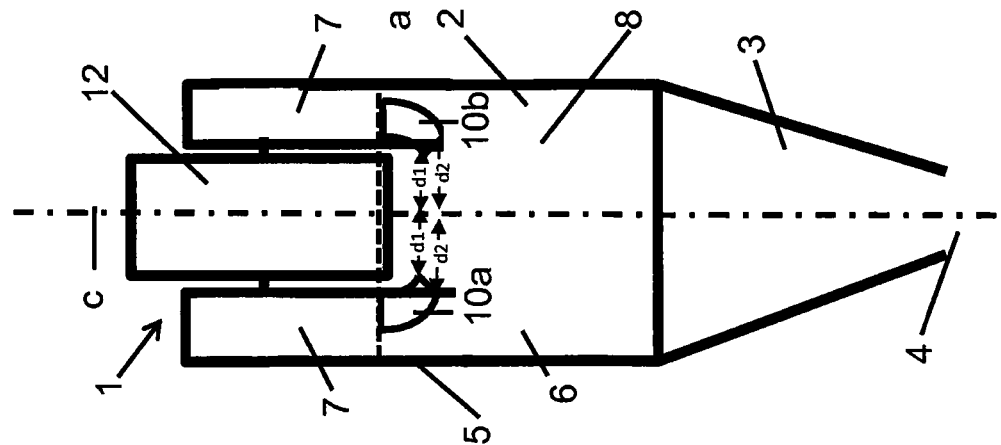

first edge e1 shows a distance L1 to the area a and the second edge e2 shows a distance L2, whereby L2>1,25*L1.

8 Claims, 2 Drawing Sheets

(52) U.S. Cl.
CPC .. *B04C 2005/136* (2013.01); *B04C 2009/004* (2013.01)

(56) References Cited

U.S. PATENT DOCUMENTS

| | | | |
|---|---|---|---|
| 5,180,257 A * | 1/1993 | Narishima | B04C 5/13 138/37 |
| 2010/0072121 A1 * | 3/2010 | Maier | B01D 45/16 210/196 |
| 2014/0299540 A1 | 10/2014 | Ackermann et al. | |

OTHER PUBLICATIONS

Written Opinion of the International Searching Authority issued by the European Patent Office acting as the International Searching Authority in relation to International Application No. PCT/EP2018/067806 dated Oct. 4, 2018 (6 pages).

International Preliminary Report on Patentability issued by the European Patent Office acting as the International Preliminary Examining Authority in relation to International Application No. PCT/EP2018/067806 dated Jun. 19, 2019 (6 pages).

* cited by examiner

CYCLONE WITH GUIDE VANES

CROSS-REFERENCE TO RELATED APPLICATIONS

This application is a national phase entry under 35 U.S.C. 371 of PCT International Application No. PCT/EP2018/067806 filed Jul. 2, 2018, which claims priority to German Patent Application No. 10 2017 114 757.8, filed Jul. 3, 2017, the disclosure of each of these applications is expressly incorporated herein by reference in their entirety.

The invention relates to a cyclone for the separation of solid particles and/or at least one liquid from a fluid, featuring a housing, an inlet opening for introducing the fluid together with the solid particles and/or the at least one liquid into the housing, a discharge port for the solid particles and/or the at least one liquid, a dip tube for discharging the fluid from the housing, and at least two guide vanes, each with a geometrical form with at least three edges e1, e2 and e3 and each guide vane being directly or indirectly fixed to the housing with at least one edge e3 at a fixing point, whereby an area a is defined as the cross-sectional area of the housing intersecting the fixing points, whereby each guide vane shows at least two edges e1 and e2 which are not fixed to the housing, whereby the first edge e1 and the second edge e2 has a distance d2, and whereby d1<d2 to the centerline of the housing.

For most different kinds of applications such as for example a circular fluid bed combustion (CFB combustion), calcining, oil recovery and for other processes it is necessary to remove and/or separate solids or liquids from hot flue gases or product gas mixtures which contain these solids or liquids, before feeding the gas into the next stage of purification, such as for example an electrical precipitator (ESP), for fulfilling environmental or in particularly product specifications.

For these processes, typically, gas cyclones are used for filtering out particulate solids from the hot flue gas or from the product gas mixture. But such cyclones are also used in steam power plants for separating water from live steam between the steam generator and the turbine or for condensate separation in gas coolers. With hydrocyclones solid particles which are contained in suspensions can be separated or classified. Therewith also emulsions such as for example oil-water mixtures are resolved.

In the different application fields, in principle, the mode of operation of these centrifugal separators is the same. The fluid together with the solids or liquids contained therein is fed from the fluid source via the feed channel into the housing of the cyclone. In the interior of the cyclone the main portion of the volume stream of the fluid (about 90%) is forced as a main stream onto a helical path, so that due to the centrifugal force the particles to be separated are thrown towards the wall of the housing. This results in the fact that the particles are separated from the stream and fall or flow downwards into the direction of the discharge port. The fluid being purified by removal of the particles exits the cyclone, for example, through a vortex finder in the form of a dip tube.

As the liquid flow in a helical pattern, beginning at the top (wide end) of the cyclone and ending at the bottom (narrow) end is the essential part of the separation efficiency, there are a number of measures to increase said flow path. Therefore, the feed is often introduced tangentially into the cyclone so incoming velocity features a tangential component.

In addition or alternatively, it is possible to have additional installations for redirecting the incoming flow. The state of the art designs have a projected chord length (projected in axial direction) of the outer guide vane chord is identical to the inner chord as disclosed e.g. in DE 43 29 662 A1. The guide vanes are usually mounted on a ring and circularly placed around the vortex finder or around the mid axis of the cyclone as it can be found for example in WO1993/009883 A1.

As pointed out, the efficiency of cyclone separators is usually a parameter, which should be as high as possible while at the same time as little as possible pressure losses are accepted. However, an increase of the inlet velocity and/or a decrease of the vortex finder diameter can help in further improving the separation efficiency but at the cost of an increased pressure drop. The same goes for additional installations in the cyclone.

Therefore, the problem underlying the invention is improved cyclone separation efficiency without a significant increase of the pressure drop.

This object is solved with a cyclone with the features of claim 1.

Such a cyclone for the separation of solid particles and/or at least one liquid from a fluid, features a housing an inlet opening for introducing the fluid together with the solid particles and/or the at least one liquid into the housing, a discharge port for the solid particles and/or the at least one liquid and a dip tube for discharging the fluid from the, preferably at least partly cylindrical, housing.

Moreover, at least two guide vanes are foreseen. Each guide vane shows a geometrical form with at least three edges e1, e2, e3. Also, each guide vane can be directly or indirectly fixed to the housing with at least one edge e3 at the fixing point situated at the edge e3. However, it is also possible, that the guiding vane is fixed at two edges and/or at least at parts of the distance between (these) two edges, e.g. e2 and e3.

Furthermore, an area a is defined as the cross-sectional area of the housing intersecting the fixing points. The at least two edges e1 and e2 being not fixed to the housing shows two distances to the centerline c of the housing, whereby the first edge e1 has a distance d1 and the second edge e2 has a distance d2, and whereby d1<d2 to the centerline of the housing.

It is the essential part of the invention that the first edge e1 shows a distance I1 to the area a and the second edge e2 shows a distance I2, whereby I2>1,25*I1. By introducing shrouded guide vanes which have an at least 25% larger outer chord length projected in axial cyclone direction particles or liquid droplets can be directed not only on a tangential path, but also simultaneously towards the outer cyclone walls. Once they accumulate there, they are no longer attracted to the low pressure core in the inner vortex of the cyclone.

Summing up the shrouded guide vanes with an increased axially projected outer chord length allow the particles to sweep towards the housing wall, from locations close to the cyclones mid axis. This is ensured via a continuous tilting of the blade surface.

The invention is specifically of interest for axial cyclones wherein the discharge port is arranged opposite to the inlet opening, since this arrangement does not provide a feed with a tangential component. However, it can also be used for improving the performance of tangential cyclones.

Moreover, it is preferred to that the geometric form features at least four edges (e1, e2, e3, e4). As a result, the overall area of each guide vane and, therefore, its effect, is enlarged. Preferably, two of the four edges, namely e3 and e4, are fixed both directly or both indirectly or one directly and one indirectly.

As a specific embodiment the geometric form is a trapezoid, whereby preferably the connection between the two edges e1 and e2 is one of the trapezoid's parallel sides. So, production as well as maintaining of the guide vanes is simplified. Using a trapezoid moreover enable a fixing on one side, preferably between edge 3 and edge 2.

In addition or alternatively it is preferred that at least one guide vane is curved in one axis. So, an additional parameter to influence radial and circumferential velocities in the cyclone is established.

In this context it is most preferred that the radius of the curve changes over the distance between edge e3 and edge e1 or edge e2. As a result, separation efficiency can be optimized.

In another preferred embodiment the at least two of the guides vanes are mounted on a support element which is fixed at the housing. This support element features preferably at least 4, more preferably 6 and even more preferably at least 10 guide vanes and is mounted in the inner circle of the housing. Preferably, it is circular and/or the guide vanes are evenly distributed. In case a support element is used, the area described by the support element, e.g. a circle defined by ring, is the area a. It is also possible to use more than one support element in one cyclone.

In another aspect of the invention it has been found that the special geometry of the guide vanes requires a distance between the area a to the opening of the dip tube in the housing which is maximum +/−40%, preferably maximum +/−20%, even more preferred maximum +/−10% of the overall length of the housing to ensure maximized separation efficiency. Additionally or alternatively, the guiding vanes are foreseen at a height of between 60 and 100%, preferably 80 and 100%, even more preferably 90 and 100% and most preferable between 95 and 100% of the overall length of the housing measured from the discharged port. The overall length of the housing is defined as the length between cap and the discharged port.

The invention also extends to various forms of the dip tube. The distance between the opening of the dip tube and the housing cap can be between 0 and 70% of the total length of the housing. At a distance of 0%, the dip tube closes flush with the housing cap and thus no longer dips into the cyclone. A maximum distance of 40% is preferred, especially a maximum distance of 20% and especially a maximum distance of 10% of the total length of the housing.

Translated with www.DeepL.com/Translator

Moreover, it is preferred to use the invention in multi-cyclones with a common pre-chamber for introducing the fluid together with the solid particles and/or at least one liquid since this arrangement requires axial cyclones.

Moreover, the invention also covers a single guide vane with the features of claim 9.

Such a guide vane for a cyclone shows a geometrical form with at least three edges e1, e2 and e3, whereby at least one edge e3 features meaning for fixing directly or indirectly at fixing points in a housing of the cyclone. The guide vane shows at least two edges e1 and e2 which are not fixed to the housing, whereby the first edge e1 has a distance d1 and the second edge e2 has a distance d2, and whereby d1<d2 to the centerline of the housing characterized in that after the fixing an area a is defined as the cross-sectional area of the housing intersecting the fixing points. After fixing the guide vane in the housing of the cyclone, the first edge e1 shows a distance l1 to the area a and the second edge e2 shows a distance l2, whereby l2>1,2 5*l1.

Finally, the invention also covers a support element with at least four guide vanes according to claim 10, arranged such that the support element form the area a.

Further objectives, features, advantages and possible applications of the invention can also be taken from the following description of the attached drawings and the example. All features described and/or illustrated form the subject-matter of the invention per se or in any combination, independent of their inclusion in the individual claims or their back-references.

Figure 1B:
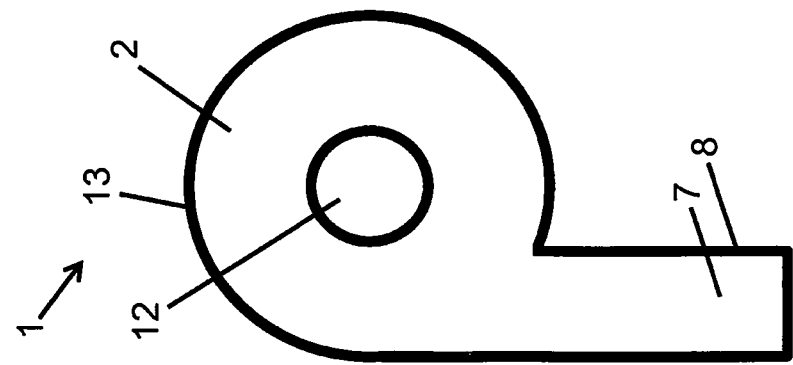
Figure 1C:
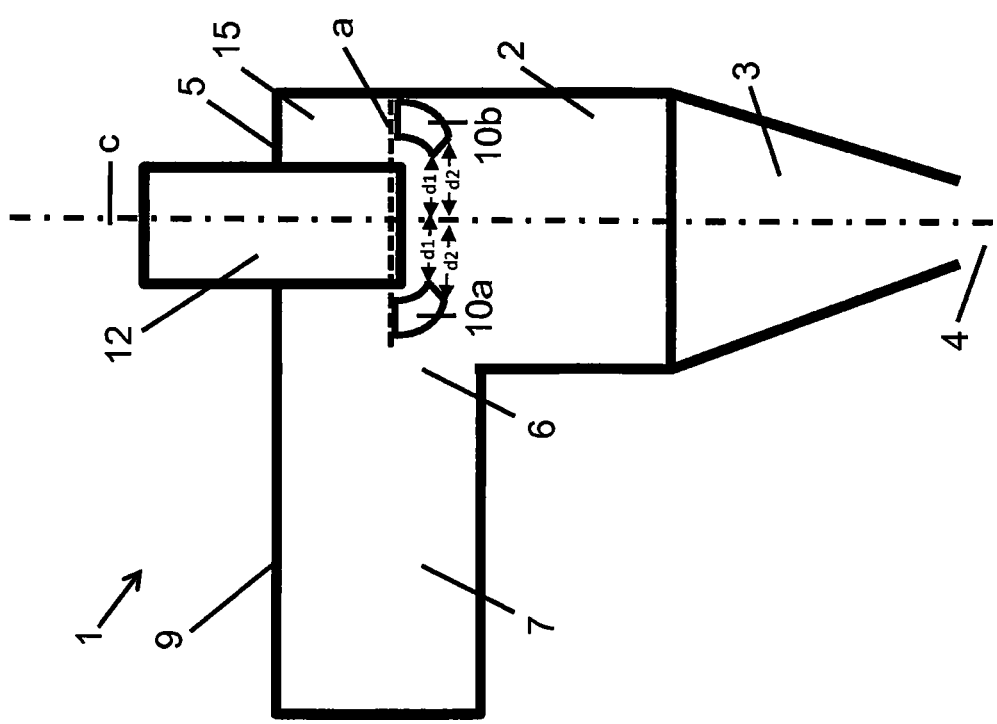
Figure 2:
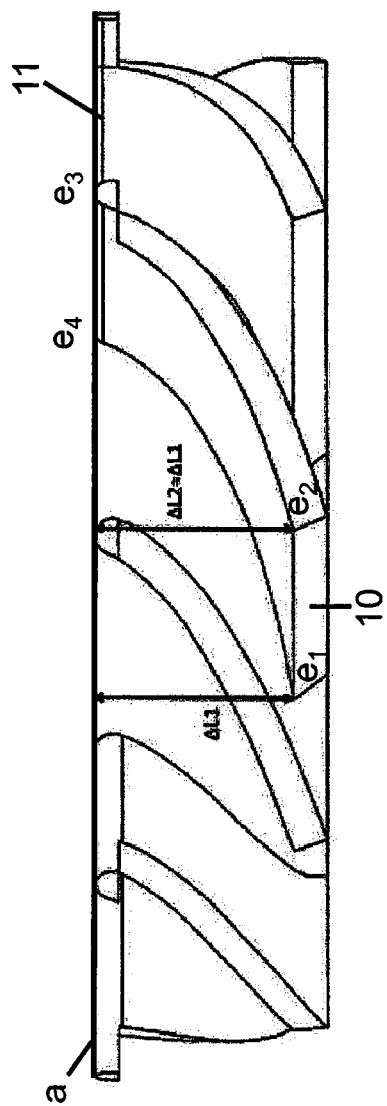
Figure 3:
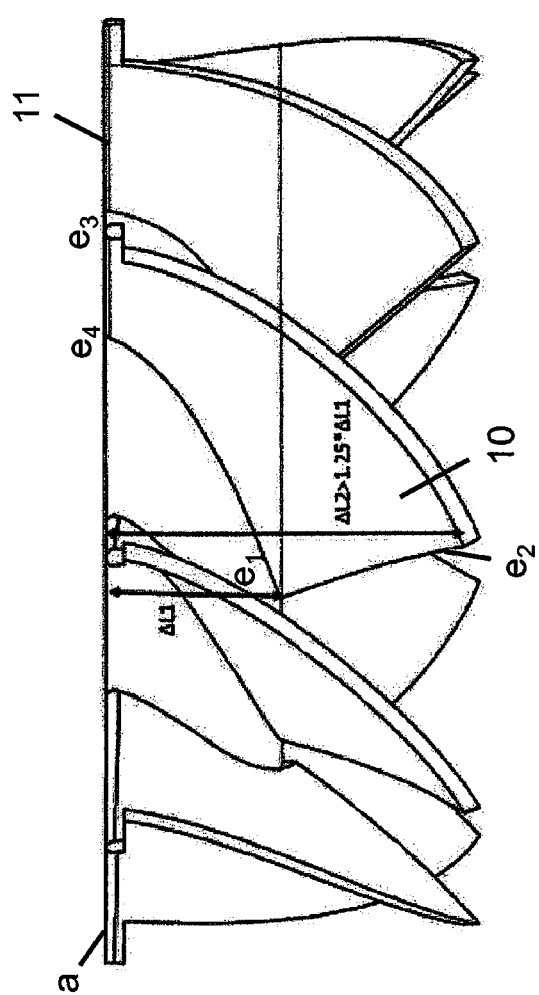

In the drawings:

FIG. 1a shows a longitudinal section of a tangentional cyclone according to a first embodiment, FIG. 1b shows a section through the inlet opening of the cyclone of FIG. 1a, FIG. 1c shows a longitudinal section of an axial cyclone, FIG. 2 shows a support element with guide vanes according to the state of the art and FIG. 3 shows a support element with guide vanes according to the invention.

The basic construction of a tangential cyclone 1 as is used for the separation of solids or liquids from a fluid stream is schematically shown in FIG. 1a.

The cyclone 1 according to the present invention comprises a cylindrical upper housing part 2 and a conical lower housing part 3. The cylindrical housing part 2 and the conical housing part 3 together form the housing 2, 3 of the cyclone 1, i.e. the cyclone housing 2, 3. The upper end of the cyclone housing 2, 3 is closed with a housing cap 5.

A dip tube or vortex finder 12 is inserted in a central opening of the housing cap 5 so that the dip tube 12 extends partially outside and partially inside the cyclone housing 2, 3.

A feed channel 7 is connected with its first end with an inlet opening 6 in the cylindrical housing part 2 of the cyclone 1. With the second end the feed channel 7 may, for example, be connected with the discharge opening of a blast furnace/a fluidized bed. The inlet opening 6 and the feed channel 7 which is directly placed thereon are arranged at the upper end of the cylindrical housing part 2. Preferably, in this case the upper wall 9 of the feed channel 7 and the housing cap 5 are arranged in a coplanar manner.

Typically, the cyclone 1 is arranged such that the conical housing part 3 is oriented downwards into the direction of the gravitational field. At its lowest point the discharge port 4 is provided through which the particles and/or the liquid which has been extracted from the fluid stream can be discharged.

During operation the fluid stream together with the particles is fed through the feed channel 7 and the inlet opening 6 into the housing part 2. This effected in a typically tangential manner (cf. FIG. 1b) so that a circular movement of the fluid stream is induced. The fluid stream moves on a helical path from the inlet opening 6 into the direction of the conical region 3. Due to the centrifugal force the particles are transported to the outer wall of the cyclone 1 and there, by the effect of gravitation, they move into the direction of the discharge port 4. The purified gas or, in the case of a hydrocyclone, the purified liquid exits the cyclone 1 upwards through the dip tube 12.

According to the invention, the cyclone 1 features at least two guide vanes 10a, 10b. These guide vanes 10a, 10b are mounted such that an area a is defined as the cross-sectional area of the housing intersecting the fixing points, whereby each guide vane shows at least two edges e1 and e2 which are not fixed to the housing. The first edge e1 has a distance d1 and the second edge e2 has a distance d2 to the cyclone central axis, whereby d1<d2 to the centerline of the housing.

FIG. 1c is directed to an axial cyclone. However, the only difference is the position of the feed channel 7 which introduces the incoming stream comprising a fluid with particles and/or liquid droplets from the top of the cyclone 1.

FIG. 2 shows the guide vanes 10 known from the state in the art in more detail. All guide vanes 10 are fixed to a support element, which is also used to install the guide vanes 10 into the cyclone 1. In case a support element is used, the area described by the support element, e.g. a circle defined by ring, is the area a.

As it can be seen from FIG. 2, both edges e1 and e2, which are not fixed to the support element, show the same distance to the area a.

FIG. 3 depicts a design of the guide vanes 10 being mounted to a support element 11, which also defined area a. The distance from the first edge e1 to the area a is defined as length l1 while the distance from the second edge e2 to the area a is defined as length l2. Both lengths l1 and l2 depend from each other such that l2 >1,25*l1.

LIST OF REFERENCE NUMERALS 1 cyclone
2 cylindrical housing part
3 conical housing part
4 discharge port
5 housing cap
6 inlet opening
7 feed channel
8 inner wall of the feed channel
9 upper wall of the feed channel
10a,b guide vane
11 support element
12 dip tube
a area described by the fix points of the guide vanes
c cyclone central axis
e1-e4 edges of the guide vane
d1, d2 distance of an edge to the cyclone central axis
l1, l2 distance of an edge to the area a

The invention claimed is:

1. A cyclone for the separation of solid particles and/or at least one liquid from a fluid, comprising a housing, an inlet opening for introducing the fluid together with the solid particles and/or the at least one liquid into the housing, a discharge port for the solid particles and/or the at least one liquid, a dip tube for discharging the fluid from the housing, and at least two guide vanes, each with a geometrical form with at least three corners e1, e2, e3 and each guide vane being directly or indirectly fixed to the housing with at least one corner e3 at a fixing point, whereby an area a is defined as the cross-sectional area of the housing intersecting the fixed corners e3, whereby each guide vane shows at least two corners e1 and e2 which are not fixed to the housing, whereby the first corner e1 has a distance d1 and the second corner e2 has a distance d2, and whereby dl<d2 to the centerline c of the housing wherein the first corner e1 shows a distance L1 to the area a and the second corner e2 shows a distance L2, whereby L2 >1.25×L1, wherein the geometric form features at least four corners e1, e2, e3 and e4, whereby two corners e3 and e4 are fixed directly or indirectly, and wherein the geometric form is a trapezoid and the connection between the two corners e1 and e2 is one of the trapezoid's parallel sides.

2. The cyclone according to claim 1, wherein the discharge port is arranged opposite to the inlet opening.

3. The cyclone according to claim 1, wherein at least one of the guide vanes is curved in one axis.

4. The cyclone according to claim 3, wherein the radius of the curving changes over the distance between corner e1 and corner e3 and/or corner e2 and corner e3.

5. The cyclone according to claim 1, wherein the at least two of the guides vanes are mounted on a support element which is fixed at the housing.

6. The cyclone according claim 1, wherein the distance between the area a to the opening of the dip tube in the housing is maximum 40% of the overall length of the housing and/or that the distance between the area a to the opening of the dip tube is at a height of between 60 and 100% of the overall length of the housing measured from the discharged port.

7. The cyclone according to claim 1, wherein the distance between the opening of the dip tube and the housing cap is between 0 and 70% of the total length of the housing.

8. A support element with at least four guide vanes, whereby each guide vane comprises a geometrical form with at least three corners e1, e2 and e3, whereby at least one corner e3 is fixed to the support element at fixing points, whereby each guide vane comprises at least two corners e1 and e2 which are not fixed to the support element, whereby the first corner e1 has a distance d1 and the second corner e2 has a distance d2, and whereby dl<d2 to a centerline c of a housing, wherein the support element forms the area a and that the first corner e1 comprises a distance L1 to the area a and the second corner e2 comprises a distance L2, whereby L2 >1.25×L1, wherein the geometric form features at least four corners e1, e2, e3 and e4, whereby two corners e3 and e4 are fixed directly or indirectly, and wherein the geometric form is a trapezoid and the connection between the two corners e1 and e2 is one of the trapezoid's parallel sides.

* * * * *